Oct. 31, 1933.  E. FETTER  1,932,692
METHOD OF AND APPARATUS FOR VULCANIZING TIRES
Original Filed Aug. 11, 1928   2 Sheets-Sheet 2
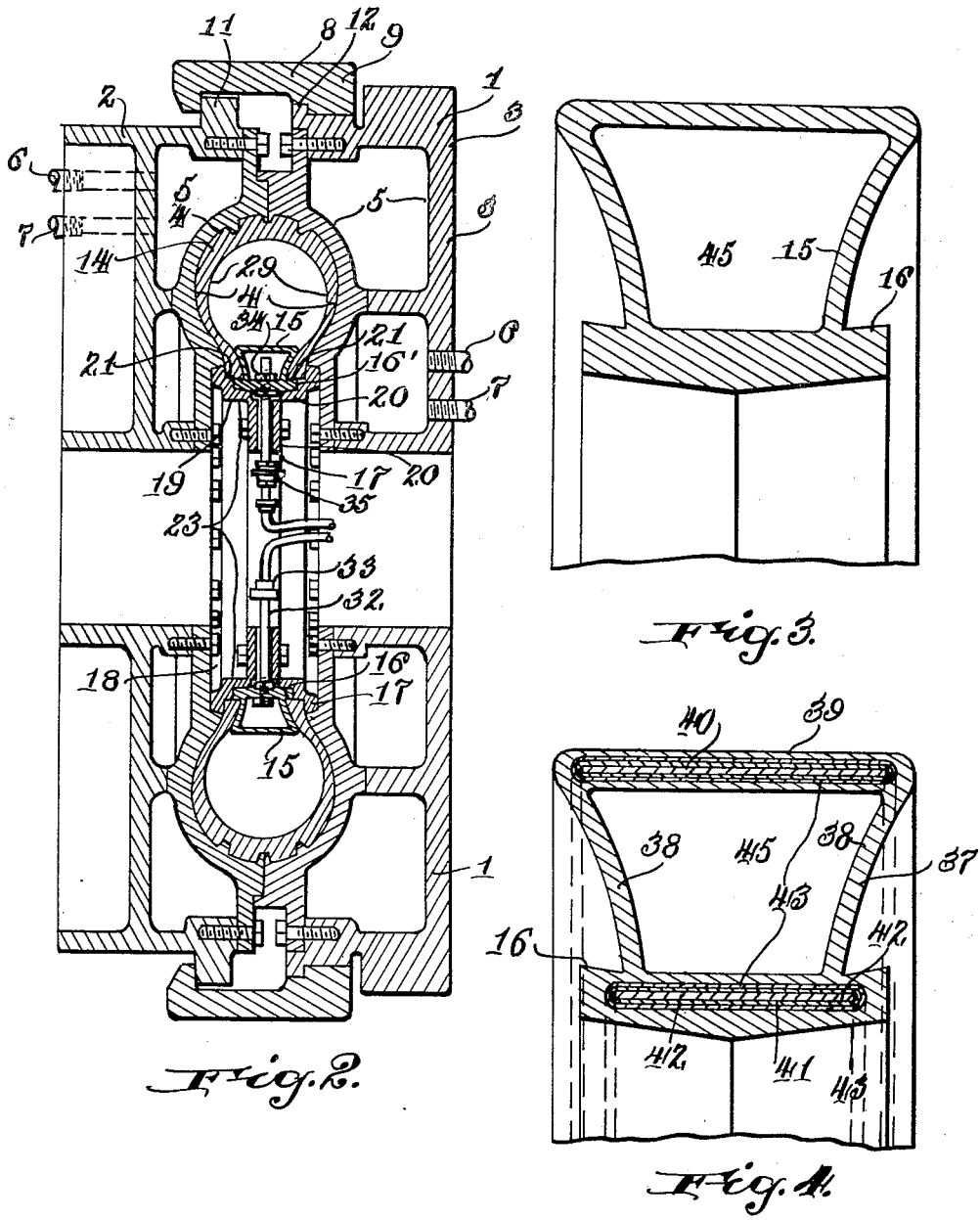

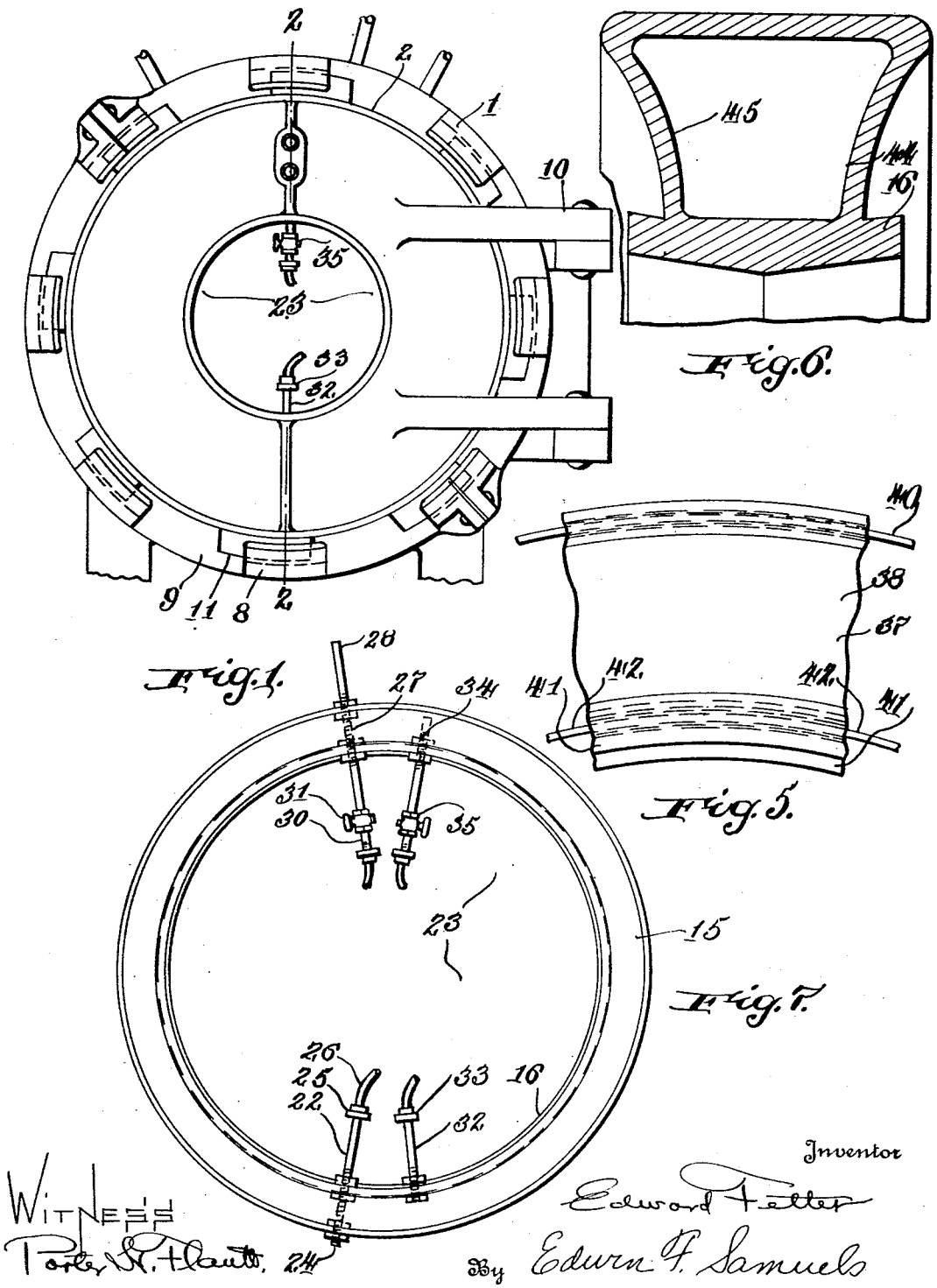

Patented Oct. 31, 1933

1,932,692

UNITED STATES PATENT OFFICE 1,932,692

METHOD OF AND APPARATUS FOR VULCANIZING TIRES

Edward Fetter, Baltimore, Md.

Application August 11, 1928, Serial No. 298,912
Renewed October 2, 1931

16 Claims. (Cl. 18—17)

The invention relates to the manufacture of pneumatic tires, referred to in the trade as outer casings or shoes.

The conditions of use to which such tires or outer casings are subjected require a high degree of flexibility in the treads and side wall portions, and some elasticity. The bead which engages the rim should be comparatively hard and rigid and inelastic. At the same time it must be tough and wear resisting to the highest degree, the main requirement being that it shall, during the entire life of the tire, effect an engagement with the rim which will prevent the tire from jumping, i. e., becoming accidentally released from the rim.

To meet these, and other conditions presented, it is found desirable to more completely vulcanize the bead portion of the tire, then the tread and side wall portions. While this deprives the bead of a certain degree of flexibility which is necessary to the tread and side walls, it gives a tougher bead which resists elongation and also resists the rough treatment to which the bead is subjected in mounting and removing and all tendency to accidental removal of the tire from the rim.

In accordance with the process and apparatus to which the invention relates, this extra vulcanization of the bead portion is accomplished by providing a ring referred to hereinafter as a bead ring, which, during the vulcanizing process, is located between the beads of the tire or shoe and which is filled with vulcanizing medium, hot water or steam, whereby the beads may be subjected to a higher vulcanizing temperature than the remainder of the casing or tire.

This bead ring may be of metal or otherwise of rigid construction, or it may be a flexible member expanded by inflation and filled with fluid under pressure, which may be vulcanizing medium or unheated fluid, whereby pressure in excess of that applied to the remainder of the casing may be applied to the bead portions of the tire during vulcanization, thus giving them greater density and toughness and, further, rendering them comparatively inelastic, giving them an increased capacity to resist rough treatment and any tendency to accidental removal or release of the tire from the rim. The excess of pressure in the bead ring as compared to that within the remainder of the casing is also of great advantage if not absolutely necessary in order to prevent the escape of the inflating fluid from the inside of the casing. Such escape of the fluid is found objectionable in that it causes the fluid under pressure to be applied to the exposed edges of the fabric at the outer edge of the bead tending to admit this fluid between these layers and make the tire porous, and where an inflating fluid is used at a relatively low temperature, the admission of additional fluid interferes with the heating of the casing and with the process of vulcanization making a satisfactory product difficult if not impossible to obtain.

In the accompanying drawings I have illustrated the tire or tire casing mold known as a watch case vulcanizer, the same being equipped with a bead ring in accordance with the invention and otherwise embodying the features of the invention and adapted to operate in accordance with the method which is a feature of my invention.

In the drawings:

Figure 1 is a side elevation of a watch case or similar vulcanizer equipped in accordance with the invention.

Figure 2 is a section at right angles to Figure 1 and taken on the line 2—2 of Figure 1.

Figure 3 is a detail view in the nature of a transverse section through the bead ring showing the same as rigidly constructed of metal or any suitable material.

Figure 4 is a similar section showing the bead ring formed with its inner and outer peripheral walls rigid and its side walls flexible and expansible by inflation.

Figure 5 is a fragmentary side elevation of the same.

Figure 6 is a section corresponding to Figures 3 and 4 showing the bead ring made entirely of rubber.

Figure 7 is a side elevation of the bead ring complete, removed from the mold.

Referring to the drawings by numerals, each of which is used to indicate the same or similar parts in the different figures, the vulcanizer or vulcanizing mold 1, which may be of any suitable type adapted to vulcanize outer casings or shoes of pneumatic tires, is shown in the form of a watch case vulcanizer 1 having cooperating contacting mold sections 2 and 3, each containing a portion substantially half of an annular mold cavity 4.

The mold cavity may be heated in any suitable manner, being shown as provided with jackets 5 for the heating medium, which may be steam or hot water, and through which the heating medium may be circulated by way of inlet pipes 6 and return pipes 7. The mold sections 2 and 3 are, in the form of the invention shown, held in closed or operative position by means of a clamping ring 9 and the sections 2 and 3 are further supported and moved to and from loading position on and by means of hinges 10, the clamping means referred to being in accordance with the usual practice. The ring 9 carries external clamping wedge members 8 which cooperate with corresponding wedge members 11 on the mold section 2, the ring rotating on a peripheral shoulder 12 on the mold section 3.

In the operation of vulcanizing casings, in accordance with the invention, a casing blank 14 of raw rubber is placed in the mold, a bead ring 15 being placed between the beads. This bead ring, being provided with peripheral flanges 16, partially encloses the beads as to their inner periphery, the bead ring and the beads being further enclosed by means of a bull ring 17, which fits inside a suitable annular cavity 18 in the inner periphery of each mold section 2 and 3 and concentric therewith, the bull ring 17 serving to close the cavity 4 within the mold sections 2 and 3 as to the inner peripheral wall thereof and the bead ring 4 serving to close the space between the beads 21 of the tire. The bull ring 17 is formed in two sections 19 and 20 which are bolted together enclosing the inner periphery of the bead ring and its flange 16 on its respective opposite side edges 16', at the same time enclosing the beads 21 as to the edges thereof opposite the bead ring.

Referring now to Figure 7, in the preferred form of the invention illustrated, the casing is wholly or partially vulcanized from without and is inflated from within against the walls of the mold, any suitable medium, as steam or hot water, heated to vulcanizing temperature preferably being used. To this end an inlet tube 22 is passed from the central space 23 within the mold ring completely through the bead ring 15 having discharge ends 24 on the outside of the ring, which, in the operation of the apparatus, is inside the tire casing, and a threaded inner end 25 to which a supply of steam under pressure may be led by way of a tube 26.

The bead ring 15 also carries an outlet or release tube 27 leading from the inside of the casing. This is preferably at the top and has its intake end 28 spaced well upwardly toward the top of the chamber 29 within the casing 14 being vulcanized. The outlet tube 27 is provided with an end 30 which is exposed inside the space 23 within the bead ring and which may discharge into the atmosphere or otherwise, being preferably controlled by a pet cock 31 so that the vulcanizing medium may be continuously released at this point to maintain a circulation, and throttled to keep up the temperature and pressure, or the tube may be used merely as an air discharge The bead ring 15 being a separate container, is also provided with an inlet nipple 32 which may be connected to a steam or hot water supply, or other heating pipe 33. The hollowed bead ring 15 is also provided with an outlet nipple 34 which may be provided with a pet cock 35 or connected in any suitable manner. The discharge nozzle may be used merely to release air or cold fluid or a continuous circulation may be maintained, the steam or water being throttled at this point, regulating the temperature and pressure.

The cross section, Figure 3, shows a bead ring 15 which is substantially rigid, being made of metal or other suitable material. The cross section, Figure 4, shows a ring 37 which is capable of expansion by inflation, being formed with its side walls 38 of rubber or rubber and fabric, its outer peripheral wall 39 being reinforced by means of a flat metal ring 40 or in any suitable manner. The inner peripheral wall 41 is reinforced by a sheet metal ring 42 similarly flattened, or provided with any suitable reinforcement. The rings 40 and 42, as shown, are flat and in a plane parallel to the axis and of a length parallel to the axis slightly less than the width of the ring 37, measured parallel to the axis of the corresponding walls which they reinforce. The use of the stiffening members 40 and 41 has the advantage that it makes the ring much more easily insertable within the casing and within the mold. Also the stiffening members by imparting rigidity to the inner and outer peripheral walls of the ring, prevent distortion and deformation of the beads which at this time are relatively soft and flexible and capable of assuming any shape in which they are held during vulcanization. These rigid supporting members 40 and 41, may be applied in any suitable and preferred manner, the arrangement not being confined to the form illustrated.

The rings 40 and 41, as shown, are completely enclosed in a rubber and fabric covering 43 which is vulcanized to the metal in a well known manner and connected to and formed integral with the side walls 38. This ring can be made in a mold by any one skilled in the vulcanizing of hollow rubber articles and their reinforcement with wire or other metal shapes.

Figure 5, which is a side view of the ring 37, Figure 4, shows the ends of the bands or rings 40 and 41 protruding from the rubber fabric which forms a ring 38, the illustration being fragmentary, and the rubber and fabric being removed from the reinforcement material at the ends of the fragment shown.

Figure 6 shows a bead ring 44 made in accordance with the invention, as already described, being constructed of vulcanized rubber. It will be understood that all of the bead rings 15, 37 and 44 are hollow rings providing an annular chamber 45 which serves as a separate vulcanizing chamber and may in the rings 37, 45, also serve as a pressure chamber for applying a different, and usually a higher, pressure, as well as temperature, to the bead portion of the tire or shoe.

The rings 37 and 45 having flexible walls may be used to greater advantage than rigid ring 15 to effect a tight closure between the beads 21 of the casing facilitating the inflation of the shoe or casing within the mold without the use of the usual bag, and also facilitating the vulcanization of the casing from within as well as from without, the question as to whether the casing is also vulcanized from without being immaterial. It will also be understood that the bead ring is equally adapted to the process now in use whereby a relatively cool fluid is used to inflate the casing and the ring, the heating of the external mold being relied upon to impart the vulcanizing temperature to the rubber.

In the operation of vulcanizing a tire shoe or casing in accordance with the invention, a casing blank of raw rubber is placed in one of the mold sections 2, 3, the bead ring 15 being placed between the beads, the bull ring sections are then assembled on each side of the bead and bead ring in the annular chamber 18 within the mold sections and bolted together, as illustrated. The mold sections then being clamped, the bead ring having been inflated to a suitable pressure the casing is inflated within the mold by the introduction of fluid under pressure through the inlet nipple or tube 22. If a heated medium is used to vulcanize or assist in the vulcanization of the casing from within, the pet cock 31 is left open to release the air from the casing and may be then closed to prevent exhaust of the vulcanizing medium, or left slightly open to maintain the circulation, the inflating medium being throttled within the casing to maintain the pressure. The casing may be further heated to assist in vulcanization by the introduction of heating medium into the jackets 5 by way of the pipe 6.

If the rigid bead ring 15 is employed it is merely necessary to fill this ring with heating medium and maintain the supply of heating fluid, the air being released by way of the nipple 34. The valve 35 may be then closed or the heating medium may be throttled by partially closing this valve, maintaining the desired temperature.

In order to more thoroughly vulcanize the bead, heating medium at a higher temperature than that used in the casing may be supplied to the ring or any means may be used to keep the ring at a higher temperature than the vulcanizing medium applied to the remainder of the casing. In this way the bead is more thoroughly vulcanized than the remainder of the casing, making it harder and tougher and less flexible and elastic.

When the flexible inflatable rings 37, 44, are used it is desirable to introduce the heating and inflating medium into these rings before inflating the casing, or simultaneously with the inflation of the casing and introduction of heating medium there. By introducing a heating medium at a higher temperature and a higher pressure into the rings 37 or 44 a bead of greater density and vulcanized to a greater extent than the remainder of the casing is obtained, giving the desired effect of a bead which is tougher and harder and less apt to be released from the rim than the beads now being constructed by the previously existing methods, and the flexible bead ring greatly facilitates vulcanization of the casing from within by effecting a tight closure of the chamber 29 inside the casing or tire without the use of a bag, which would act as an insulator and interfere with vulcanization; but the use of the ring as a closing means is not affected by the temperature of the inflating medium used in the ring or in the casing and is not dependent upon or incident to vulcanization by heating from within. The inflation of the ring to a higher pressure than that applied to the remainder of the casing assists in the attainment of a tight and effective closure of the casing by this means.

The process of vulcanization is timed according to well known rules and the manner of removing and cooling the casing is also controlled by the existing practice.

I have thus described specifically and in detail a tire vulcanizing apparatus and method embodying the features of my invention in the preferred form in order that the manner of constructing, operating and using the same may be fully understood, however, the specific terms herein are used descriptively rather than in a limiting sense, the scope of the invention being defined in the claims.

What I claim as new and desire to secure by Letters Patent is:

1. The method of vulcanizing outer casings or shoes of pneumatic tires which consists in applying to the tread portion and side walls a suitable molding pressure and a temperature of vulcanization for a suitable period to cure the rubber, giving the desired flexibility and elasticity, and applying to the bead portion of the tire a suitable pressure and a higher temperature of vulcanization.

2. The method of vulcanizing outer casings or shoes of pneumatic tires which consists in applying to the tread portion and side walls a suitable molding pressure and a temperature of vulcanization for a suitable period to cure the rubber, giving the desired flexibility and elasticity, and applying at the same time to the bead portion of the tire a suitable pressure and a higher temperature of vulcanization.

3. The method of vulcanizing outer casings or shoes of pneumatic tires which consists in applying to the tread portion and side walls a suitable molding pressure and a temperature of vulcanization for a period sufficient to cure the rubber, giving the desired flexibility and elasticity, and applying at the same time to the bead portion of the tire a higher pressure than that applied to the rest of the casing and a higher temperature of vulcanization than the remainder of the tire.

4. The method of vulcanizing pneumatic tires or casings which consists in applying to the tread and side walls a molding pressure and a temperature of vulcanization for a period sufficient to cure the rubber, giving the desired flexibility and elasticity, and applying to the bead portions of the tire a higher pressure and a vulcanizing temperature different from that applied to the remainder of the tire.

5. A vulcanizing mold for pneumatic tires comprising cooperating annular mold sections having cooperating annular mold cavities, a hollow bead ring to fit between the bead portions of the tire, means for applying vulcanizing temperature to the tread and side walls of the tire, and means for heating the bead ring and maintaining the tire beads at a higher temperature than the remainder of the tire.

6. A tire vulcanizing apparatus comprising means enclosing a tire mold cavity, a hollow bead ring fitting between the beads of the tire, means for supplying heating fluid to the inside of the bead ring and for supplying heating fluid at a lower temperature to the inside of the tire whereby the tread and side walls of the casing are subjected to a different vulcanizing temperature from that applied to the tire beads.

7. A tire vulcanizing apparatus comprising a casing mold, a hollow bead ring fitting between the beads of the tire, means for supplying heating fluid to the inside of the bead ring and for supplying heating fluid at a lower temperature to the inside of the tire, the same being maintained separate from the fluid introduced into the bead ring whereby the tread and side walls of the casing are subjected to a different vulcanizing temperature from that applied to the beads.

8. A tire vulcanizing apparatus comprising an annular tire mold, a hollow bead ring to fit between the beads, the ring being in the form of a separate closed container having flexible side walls, means for supplying vulcanizing medium at vulcanizing temperatures and molding pressures to the inside of the bead ring, and means for supplying vulcanizing medium at vulcanizing temperatures and at molding pressure to the inside of the casing.

9. A tire vulcanizing apparatus comprising an annular tire mold, a hollow bead ring to fit between the tire beads, the same having flexible side walls, means for supplying vulcanizing medium at vulcanizing temperatures and molding pressures to the inside of the bead ring, and means for supplying vulcanizing medium at different vulcanizing temperatures and at molding pressures to the inside of the casing, the inside of the casing forming a chamber which is separated from the bead ring.

10. A tire vulcanizing apparatus comprising annular mold sections having cooperating mold cavities, means for clamping the mold sections together, a hollow bead ring to fit between the beads, the same having flexible side walls, means for supplying vulcanizing medium at vulcanizing temperatures and molding pressures to the inside of the bead ring, and means for supplying vulcanizing medium at different vulcanizing temperatures and pressures to the inside of the casing, the inside of the casing being separated from the bead ring, the flexibility of the bead ring serving to close the space between the beads and make the inside of the casing a fluid tight compartment which may be utilized without a separate container for applying fluid pressure and vulcanizing temperature to the inside of the casing.

11. A vulcanizing apparatus for pneumatic tires and outer casings comprising a mold, means for heating the mold, a hollow bead ring forming a closed chamber separate from the inside of the casing beyond the ring having flexible side walls fitting between the beads, means for supplying fluid under pressure to the inside of the bead ring to inflate the same against the beads and means for admitting inflating fluid to the inside of the casing beyond the ring.

12. A vulcanizing apparatus for pneumatic tires and outer casings comprising a mold, a hollow flexible bead ring fitting between the beads of the casing and forming a chamber which is closed and separate from the remainder of the mold cavity, means for supplying fluid under pressure to the inside of the bead ring to inflate the same against the beads, said fluid being at a vulcanizing temperature, and means for applying vulcanizing temperature and pressure to the tread and side walls of the casing.

13. A vulcanizing apparatus for pneumatic tires and outer casings comprising cooperating mold sections, means for clamping the same in operative position, the sections having cooperating mold cavities, a hollow bead ring having flexible side walls fitting between the beads, means for supplying fluid under pressure to the inside of the bead ring to inflate the same against the beads, said fluid being at a vulcanizing temperature, and means for applying vulcanizing temperature and pressure to the tread and side walls of the casing, and means for supplying fluid at different vulcanizing pressure and temperatures to the inside of the casing.

14. A vulcanizing apparatus for shoes or outer casings of pneumatic tires, comprising a mold, a hollow laterally expansible inflatable bead ring fitting between the beads to close the casing and form an inflatable chamber within the casing, means for supplying fluid under pressure to the inside of the bead ring to inflate the same against the beads and close the casing, and means for inflating the casing to a pressure different from that in the bead ring.

15. A vulcanizing apparatus for shoes or outer casings of pneumatic tires, comprising an external mold and a hollow inflatable laterally expansible bead ring having a relatively rigid peripheral wall transverse to the radius of the ring.

16. A vulcanizing apparatus for shoes or outer casings of pneumatic tires, comprising an external mold and a hollow inflatable laterally expansible band ring having relatively rigid inner and outer peripheral walls transverse to the radius of the ring.

EDWARD FETTER.